(12) United States Patent
Brereton et al.

(10) Patent No.: US 7,517,608 B2
(45) Date of Patent: Apr. 14, 2009

(54) INHERENTLY SAFE REDOX FLOW BATTERY STORAGE SYSTEM

(75) Inventors: Clive Brereton, Richmond (CA); David Genders, Elma, NY (US); Gary Lepp, Vancouver (CA); Timothy David John Hennessy, Portland, OR (US)

(73) Assignee: VRB Power Systems Inc., Richmond, B.C. (CA)

( * ) Notice: Subject to any disclaimer, the term of this patent is extended or adjusted under 35 U.S.C. 154(b) by 90 days.

(21) Appl. No.: 11/716,120

(22) Filed: Mar. 9, 2007

(65) Prior Publication Data

US 2008/0220318 A1    Sep. 11, 2008

(51) Int. Cl.
*H01M 2/12* (2006.01)
*H01M 2/36* (2006.01)

(52) U.S. Cl. .......................... 429/71; 429/72
(58) Field of Classification Search ............... 429/71, 429/72, 73–89
See application file for complete search history.

(56) References Cited

U.S. PATENT DOCUMENTS

| 6,475,661 B1 * | 11/2002 | Pellegri et al. | ............... 429/105 |
| 2005/0158615 A1 | 7/2005 | Samuel et al. | |

OTHER PUBLICATIONS

Office Action for U.S. Appl. No. 11/234,778 from USPTO mailed Sep. 19, 2007, 16 pages.

International Search Report for PCT/US07/14277 filed Jun. 18, 2007, mailed on Aug. 18, 2008, 4 pgs.
Written Opinion of the International Searching Authority for PCT/US07/14277 filed Jun. 18, 2007, mailed on Aug. 18, 2008, 4 pgs.

* cited by examiner

*Primary Examiner*—Dah-Wei D Yuan
*Assistant Examiner*—Steven Scully
(74) *Attorney, Agent, or Firm*—Stoel Rives LLP; John R. Thompson

(57) ABSTRACT

An improved redox battery energy storage system is disclosed for reducing oxygen gas levels and separating oxygen gas from hydrogen gas, thus reducing the likelihood of flammable gas explosions. The system includes at least one cell, which includes a positive compartment having positive solution, a negative compartment having negative solution, and a membrane separating the positive and negative compartments. A positive reservoir is in fluid communication with the cell's positive compartment, the positive reservoir defining a positive vent space for positive gas, which includes oxygen. A negative reservoir is in fluid communication with the cell's negative compartment, the negative reservoir defining a negative vent space. A return line is in fluid communication with the negative compartment and the negative reservoir to return the negative solution from the cell to the negative reservoir through the negative vent space. A positive gas draw line is in fluid communication with the positive vent space and coupled to the return line at a connection, causing positive gas to be siphoned from the positive vent space into the negative vent space, where the negative solution of the negative reservoir scavenges the oxygen. A balancing line is in fluid communication with the positive and the negative vent spaces to recirculate oxygen-depleted positive gas to the positive vent space.

10 Claims, 4 Drawing Sheets

INHERENTLY SAFE REDOX FLOW BATTERY STORAGE SYSTEM

TECHNICAL FIELD

The present disclosure relates to battery storage systems, one example of which is a vanadium redox battery storage system with improved safety features.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments and are, therefore, not to be considered to limit the scope of the disclosure, the embodiments will be described and explained with specificity and detail in reference to the accompanying drawings in which:

DETAILED DESCRIPTION OF PREFERRED EMBODIMENTS

It will be readily understood that the components of the embodiments as generally described and illustrated in the Figures herein could be arranged and designed in a wide variety of different configurations. Thus, the following more detailed description of various embodiments, as represented in the Figures, is not intended to limit the scope of the invention, as claimed, but is merely representative of various embodiments. While the various aspects of the embodiments are presented in drawings, the drawings are not necessarily drawn to scale unless specifically indicated.

The phrases "connected to," "coupled to," and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

New technological innovations and ever-increasing demands in electrical consumption have made solar and wind power plants a viable option. Energy storage systems, such as rechargeable batteries, are an essential requirement for remote power systems that are supplied by wind turbine generators or photovoltaic arrays. Energy storage systems are further needed to enable energy arbitrage for selling and buying power during off-peak conditions.

Figure 1:
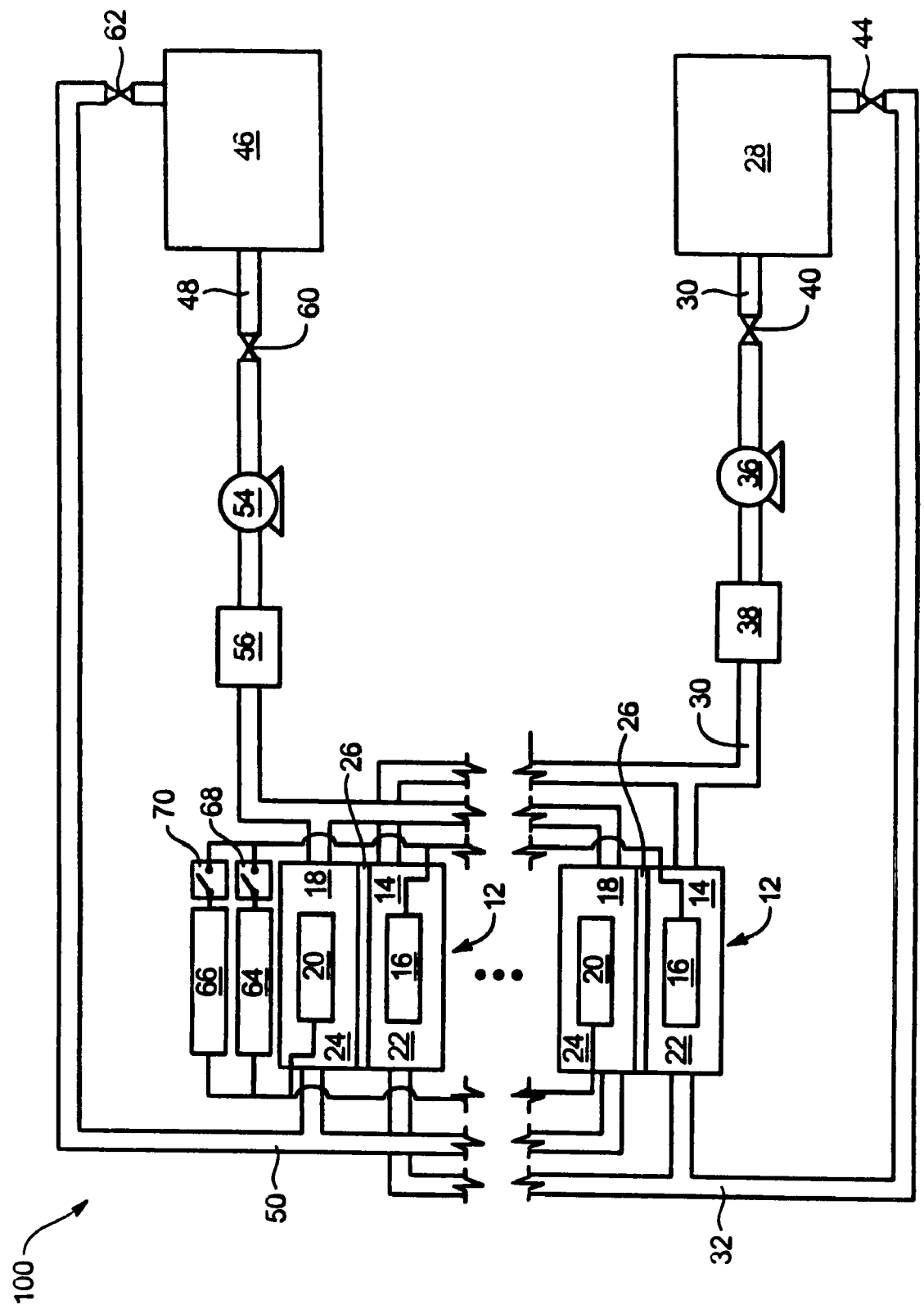
FIG. 1 is a block diagram of an embodiment of a vanadium redox battery energy storage system.

Vanadium redox battery energy storage systems (hereinafter "VRB-ESS"), as depicted in FIG. 1, have received favorable attention because they promise to be inexpensive and possess many features that provide for long life, flexible design, high reliability, and low operation and maintenance costs. A VRB-ESS may include cells holding negative and positive solutions separated by a membrane. A VRB-ESS may also rely on a pumping flow system to pass the negative and positive solutions through the cells.

A VRB-ESS may include any number of cells, depending on the quantity of electrical power to be stored, and may be limited only by geographic location, i.e., the size of the storage area. The VRB-ESS can be potentially hazardous because VRBs may generate both oxygen and hydrogen simultaneously. The hazard arises because oxygen may be produced from electrode reactions at the positive electrode, and hydrogen may be produced by the negative electrode and by reactions of the negative electrolyte in a tightly confined and at least partially shared space. Experimental measurements have found gas compositions in the ullage above the electrolyte within the explosive limits of an oxygen-hydrogen mixture.

If the vented gasses off the positive and negative electrolytes are mixed, there is the potential during normal, and especially during upset operation, to generate an explosive gas mixture. Thus, it is desirable to vent these gases separately. However, for simplicity of operation and economy of construction, it is desirable to allow the vent spaces of the positive and negative tanks to communicate. In particular, this simplifies rebalancing and minimizes consumption of any inert gas which might be used to fill the ullage above the liquid surfaces.

In view of the above conflicting requirements in VRB-ESS design, it is desirable to have a design with improved safety features which would allow the contents of the positive and negative vent spaces to mix while still ensuring safe operation. This may be accomplished through removing sufficient quantities of oxygen from the positive vent gas and maintaining the entire vent gas under a low but positive pressure. The gas mixture then becomes safe for at least two reasons: (1) an insufficiency of oxygen to fuel an explosion; and (2) the positive pressure causes hydrogen to flow outward into the environment through some manner of seal which separates it from the environment. The details of at least three embodiments of implementing this venting system, which are meant to be exemplary only, will be discussed in conjunction with FIGS. 2-4.

FIG. 1 is a block diagram of a vanadium redox battery energy storage system ("VRB-ESS" or "system") 100. System 100 includes a plurality of cells 12 that may each have a negative compartment 14 with a negative electrode 16 and a positive compartment 18 with a positive electrode 20. Suitable electrodes include any number of components known in the art and may include electrodes manufactured in accordance with the teachings of U.S. Pat. No. 5,665,212, which is hereby incorporated by reference. The negative compartment 14 may include a solution 22 in electrical communication with the negative electrode 16. The solution 22 may be an electrolyte containing specified redox ions which are in a reduced state and are to be oxidized during the discharge process of the cell 12, or are in an oxidized state and are to be reduced during the charging process of the cell 12, or which are a mixture of these latter reduced ions and ions to be reduced. By way of example, in a VRB-ESS 100, the charge-discharge redox reaction occurring at the negative electrode 16 in the solution 22 may be represented by Equation 1.1:

$$V^{2+} \leftrightarrows V^{3+} + e^- \qquad \text{Eq. 1.1}$$

The positive compartment 18 contains a solution 24 in electrical communication with the positive electrode 20. The solution 24 may be an electrolyte containing specified redox ions which are in an oxidized state and are to be reduced during the discharge process of a cell 12, or are in a reduced state and are to be oxidized during the charging process of the cell 12, or which are a mixture of these oxidized ions and ions to be oxidized. By way of example, in a VRB-ESS 100, the charge-discharge redox reaction occurring at the positive electrode 20 in the positive solution 24 may be simplistically represented by Equation 1.2:

$$V^{4+} \rightleftarrows V^{5+} + e^-$$  Eq. 1.2

The solution 22 and the solution 24 may be prepared in accordance with the teachings of U.S. Pat. Nos. 4,786,567, 6,143,443, 6,468,688, and 6,562,514, which are hereby incorporated by reference, or by other techniques known in the art. In one embodiment, the solution 22 is 1M to 6M $H_2SO_4$ and includes a stabilizing agent in an amount typically in the range of from 0.1 to 20 wt %, and the solution 24 may also be 1M to 6M $H_2SO_4$.

Each cell 12 includes an ionically conducting membrane, or porous separator 26 disposed between the positive compartment 14 and the negative compartment 18 and in contact with the solution 24 and the solution 22 to provide ionic communication therebetween. Membrane 26 serves as an ion exchange membrane and may include a carbon material which may or may not be purfluorinated. Membrane 26 may be embodied as an anion membrane, a cation membrane or a porous diaphragm.

Although the membrane 26 disposed between the negative solution 24 and the positive solution 22 is designed to prevent the transport of water, vanadium and sulfate ions, typically some amount of water, vanadium and sulfate transport occurs. Consequently, after a period of time, cells 12 become imbalanced because water, vanadium, and sulfate cross over. Each cross over typically occurs in one direction (i.e., from the solution 24 to the solution 22, or from the solution 22 to the solution 24, depending on what type of membrane 26 is used). In order to balance system 100, positive solution 24 and negative solution 22 may be mixed, which completely discharges the battery system 100.

Additional negative solution 22 may be held in a negative reservoir 28 that is in fluid communication with a negative compartment 14 through a supply line 30 and a return line 32. Reservoir 28 may be embodied as a tank, bladder, or other container known in the art. The supply line 30 may communicate with a pump 36 and a heat exchanger 38. Pump 36 enables fluid movement of the solution 22 through the reservoir 28, the supply line 30, the negative compartment 14, and the return line 32. Pump 36 may have a variable speed to allow variance in the generated flow rate. The heat exchanger 38 may transfer heat generated by resistive heating and chemical reactions from the solution 22 to a fluid or gas medium. Pump 36 and the heat exchanger 38 may be selected from any number of suitable devices known to those having skill in the art.

The supply line 30 may include one or more supply line valves 40 to control the volumetric flow of solution. The return line 32 may also communicate with one or more return line valves 44 that control the return volumetric flow.

Similarly, additional catholyte solution 24 may be held in catholyte reservoir 46 that is in fluid communication with the positive compartment 18 through the supply line 48 and the return line 50. The supply line 48 may communicate with pump 54 and heat exchanger 56. Pump 54 may be a variable speed pump 54 that enables flow of the solution 24 through the reservoir 46, the supply line 48, the positive compartment 18, and the return line 50. Supply line 48 may also include a supply line valve 60, and the return line 50 may include a return line valve 62.

A negative electrode 16 and a positive electrode 20 are in electrical communication with a power source 64 and a load 66. A power source switch 68 may be disposed in series between power source 64 and each negative electrode 16. Likewise, a load switch 70 may be disposed in series between load 66 and each negative electrode 16. One skilled in the art will appreciate that alternative circuit layouts are possible, and the embodiment of FIG. 1 is provided for illustrative purposes only, as this disclosure may apply to any combination of cells forming a VRB-ESS 100.

In charging, a power source switch 68 is closed, and a load switch 70 is opened. Pump 36 pumps solution 22 through the negative compartment 14, and the reservoir 28 via the supply line 30 and the return line 32. Simultaneously, pump 54 pumps solution 24 through the positive compartment 18 and the reservoir 46 via the supply line 48 and the return line 50. Each cell 12 is charged by delivering electrical energy from a power source 64 to a negative electrode 16 and a positive electrode 20. The electrical energy derives divalent vanadium ions in the solution 22 and quinvalent vanadium ions in the solution 24.

Electricity is drawn from each cell 12 by closing the load switch 70 and opening the power source switch 68. This causes the load 66, which is in electrical communication with the negative electrode 16 and the positive electrode 20, to withdraw electrical energy.

Figure 2:
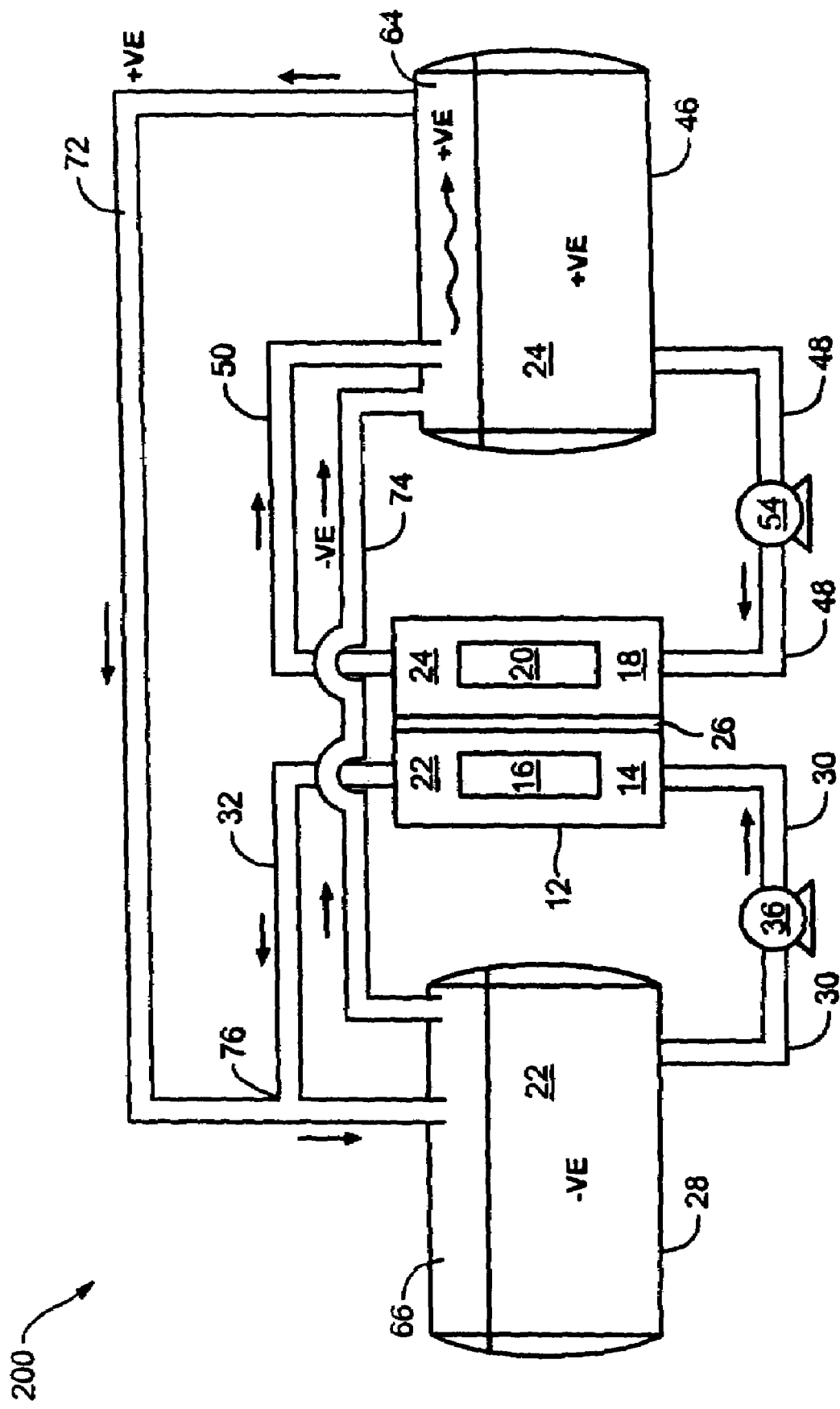
FIG. 2 is a block diagram of an embodiment of a vanadium redox battery with a negative electrolyte return line siphon.
Figure 3:
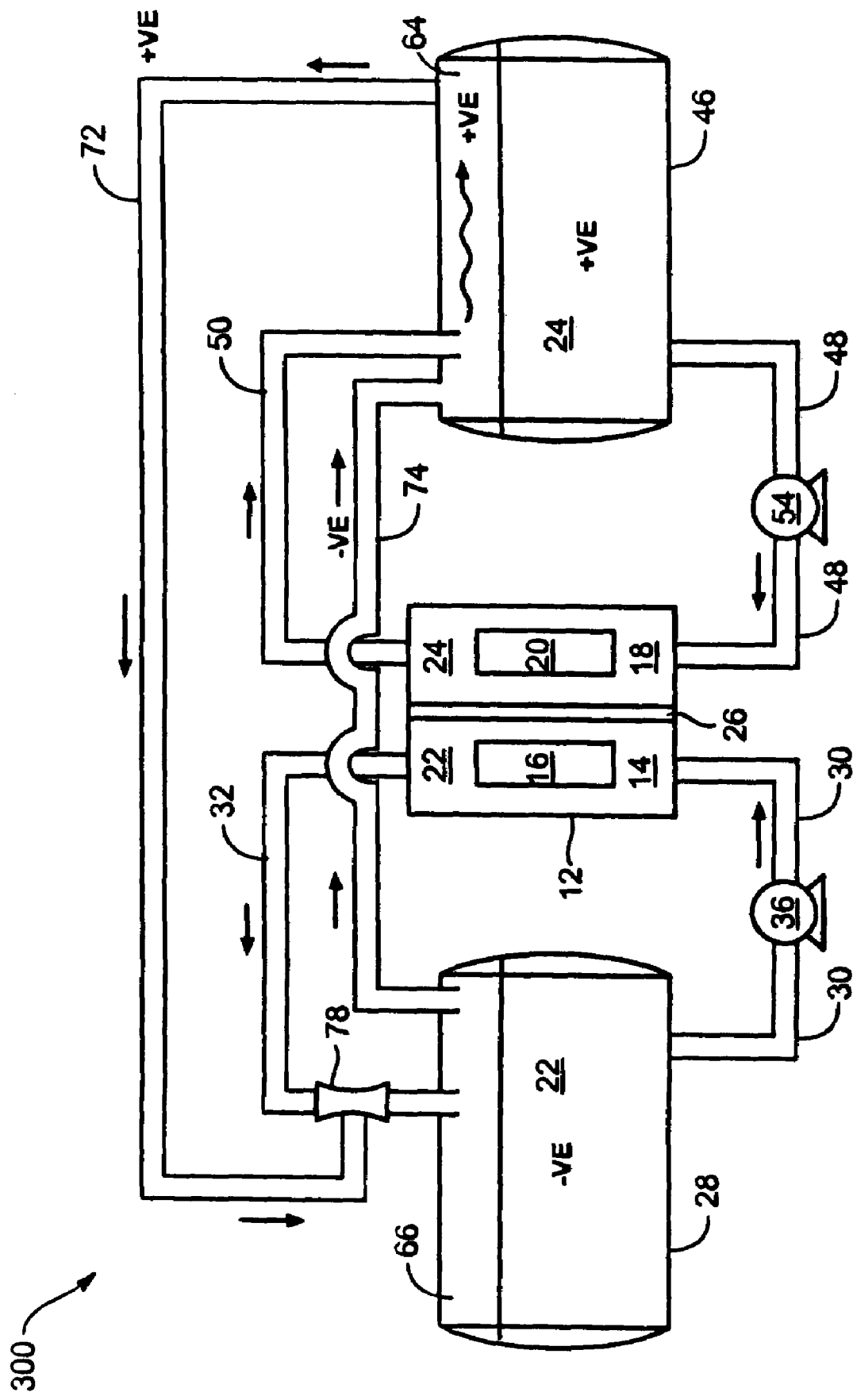
FIG. 3 is a block diagram of an embodiment of a vanadium redox battery with a main negative electrolyte flow to educt positive gas.
Figure 4:
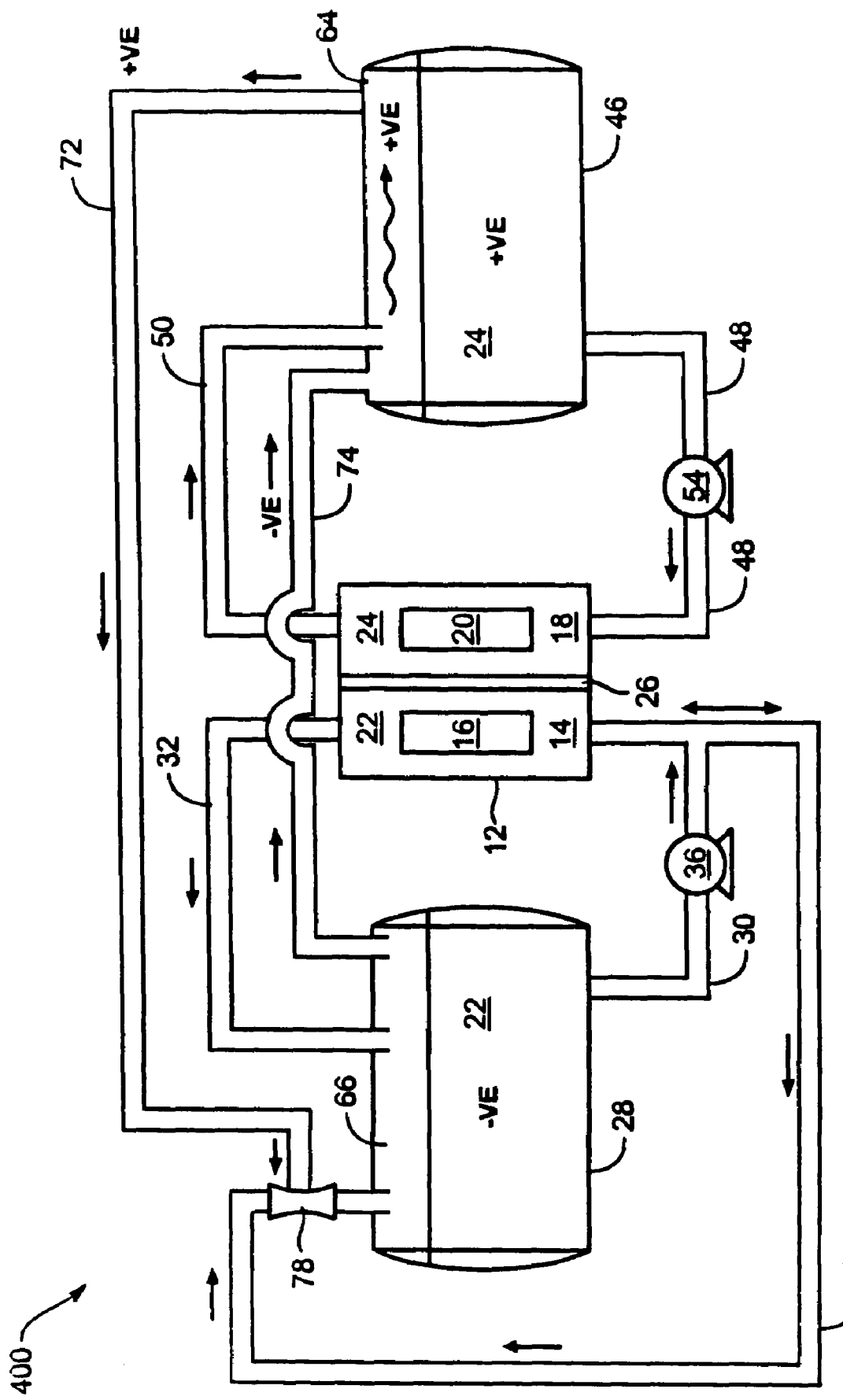
FIG. 4 is a block diagram of an embodiment of a vanadium redox battery with a negative electrolyte kick-back line and eductor for absorption.

FIGS. 2 through 4 show embodiments of the disclosure as applied to a single VRB-ESS cell 12, as shown in FIG. 1 and disclosed above. However, each embodiment may be applied to a plurality of cells 12. A negative compartment 14 has a negative solution 22 and a negative electrode 16; the negative compartment 14 is in fluid communication with a negative reservoir 28. This is accomplished with a pump 36 pumping negative electrolyte solution 22 from the negative reservoir 28 through the negative compartment 14 and back through the return line 32 into the negative reservoir 28.

Likewise, a positive compartment 18 having a positive solution 24 and a positive electrode 20, is in fluid communication with a positive reservoir 46. As with the negative side, pump 54 pumps the positive electrolyte solution 24 from the positive reservoir 46 through positive compartment 18 and back through return line 50. FIGS. 2 through 4 do not include heat exchangers or valves as discussed in FIG. 1 in order to simplify the discussion, not to infer that heat exchangers and valves are not needed or desired.

Because the negative reservoir 28 and the positive reservoir 46 both are continually circulating negative solution 22 and positive solution 24, respectively, each reservoir may have a varying amount of vent space at the top thereof where gases generated from the electrodes and solutions accumulate. As discussed, it is desirable that the positive vent space 64 of the positive reservoir 46 and the negative vent space 66 of the negative reservoir 28 are allowed to communicate for simplicity of operation and economy of construction. Such construction, however, allows the oxygen produced by the positive solution 24 in the positive reservoir 46 to mix with hydrogen produced by the negative solution 22 of the negative reservoir 28, creating a potentially flammable gas mixture where positive vent space 64 and negative vent space 66 communicate.

A feature of the VRB-ESS electrolytes is that the negative electrolyte, solution 22, is an excellent oxygen scavenger. A mixed V2:V3 solution, or even a mixed V3:V4 solution, absorbs oxygen rapidly and may reduce the oxygen level below the minimum oxygen concentration required for an explosion or flame propagation. The challenge is how to use the negative solution 22 in the negative reservoir 28 as a scavenger so that, at no point in the entire vent system, is the gas mixture explosive.

Embodiments to remove oxygen may use momentum associated with recirculating negative electrolyte −VE, to effect a local reduction in pressure in solution 22 (below the pressure in the +ve ullage), thus drawing oxygen-containing positive +VE gas through a +VE gas draw 72 and thereby scrubbing oxygen from the positive electrolyte vent space 64. Thus, a corresponding volume of negative −VE gas (minus any absorbed oxygen) is returned through a balancing line 74 back into the positive vent space 64. As there is always a possibility of oxygen being generated and being added back into the positive +VE gas in the positive vent space 64, a continuous entrainment of positive +VE gas into the negative solution 22 flow can be used to keep oxygen levels low or depleted below hazardous levels.

FIG. 2 is an embodiment 200 using a −VE electrolyte solution return line 32 siphon as an absorber, shown as applied to a single VRB cell 12. Cell 12 is configured so that the negative solution 22, a fluid, "siphons" back into its reservoir 28. At connection 76, the positive +VE gas draw 72 coming from the positive vent space 64 may connect into the negative return line 32. At connection 76 in the return piping line 32, and indeed at most points along the return line 32, there is a lower pressure than the opposing vent space, in this case the positive vent space 64. Properly piped, the negative solution 22 in the return line 32 may draw gas from the positive vent space 64, causing oxygen-containing positive +VE gas to pass through the +VE gas draw 72 to be scavenged by the negative solution 22 found in the negative reservoir 28.

In FIG. 3, system 300 includes an eductor 78, which both extracts and absorbs (or scavenges) oxygen from the positive +VE gas pulled off of the positive vent space 64. Water jet eductors utilize the kinetic energy of one liquid to cause the flow of another liquid or gas. Eductors normally consist of a converging nozzle, a body, and a diffuser. In operation, the pressure energy of the reactive motive liquid, here the negative solution 22 of the negative return line 32, is converted to velocity energy by the converging nozzle. Thus, the eductor 78 may be coupled to the negative return line 32 to allow negative solution 22 to pass through it, acting as the reactive motive liquid. The +VE gas draw 72 may be connected into the body of the eductor 78. The high velocity liquid flow of the negative solution 22 then entrains the positive +VE gas in the +VE gas draw 72 into the eductor 78.

Complete mixing of the reactive motive liquid, or the negative solution 22, and the suction, or the positive +VE gas, is performed in the body and diffuser sections, wherein the negative solution 22 scavenges oxygen from the positive +VE gas. The mixture of the negative solution 22 and the positive VE+ gas is then converted back to an intermediate pressure after passing through the diffuser, and flows into the negative reservoir 28.

Negative solution 22 in reservoir 28 may scavenge any oxygen the eductor 78 may have failed to remove during the entrainment of +VE gas from the positive vent space 64. Thus, the entire recirculation of the positive +VE gas stream, from the catholyte vent space 64, through the +VE gas draw 72, through the eductor 78, and back through the balancing line 74, takes place to feed the eductor 78 for oxygen removal. The pressure differential between the eductor 78 and the positive vent space 64 may simply be an incidental aid to the drawing power of the eductor 78. Likewise, pressure differential inherent in the system will continue to help separate oxygen and hydrogen gases in communicated regions of vent spaces 64 and 66.

Referring to FIG. 4, system 400 employs an eductor 78, but with a partial recirculation system. System 400 includes the addition of a kick-back line 80, which is a line split off of the negative supply line 30 and funneled back into the negative reservoir 28. The eductor 78 is then coupled into the kick-back line 80 with the +VE gas draw 72 connected into the body of the eductor 78. Thusly connected, the negative solution 22 of the kick-back line 80 acts as the reactive motive liquid to entrain the positive +VE gas into the eductor 78. Because only part of the negative solution 22 from supply line 30 is used as the reactive motive liquid, it is called a partial recirculation stream. The result is substantially as described with reference to FIG. 3: the positive +VE gas is sucked into the eductor 78, mixing with the negative solution 22, which scavenges oxygen from the +VE gas before the mixture is pumped into the negative vent space 66.

System 400 may be employed where reservoirs are common across multiple cells 12 ("tank mixing"), and where feeding negative return lines 32 into multiple eductors 78 is more difficult or expensive to manufacture.

It will be obvious to those having skill in the art that many changes may be made to the details of the above-described embodiments without departing from the underlying principles of the invention. While the description is made in the context of a vanadium redox battery, the principles can equally be applied to any redox flow battery system where hydrogen and oxygen can be made on the cathode and anode respectively and where the negative solution has the capacity to react with oxygen. Another example is the vanadium bromine battery. The scope of the present invention should, therefore, be determined only by the following claims.

The invention claimed is:

1. A redox battery energy storage system comprising:
   a cell including a positive compartment having positive solution, a negative compartment having negative solution, and a membrane separating the positive and negative compartments;
   a positive line coupled to the positive compartment to carry positive solution;
   a positive reservoir coupled to the positive line and having positive solution, the positive reservoir having a positive vent space for positive gas, including oxygen;
   a negative line coupled to the negative compartment to carry negative solution;
   a negative reservoir coupled to the negative line and having negative solution, the negative reservoir having a negative vent space for negative gas;
   an eductor;
   a kick-back line coupled to the negative line and to the negative reservoir to partially recirculate the negative solution, the eductor coupled to the kick-back line, the negative solution of the kick-back line to act as a motive liquid; and
   a positive gas draw line in fluid communication with the positive vent space and coupled to the eductor, whereby the eductor entrains positive gas from the positive vent space and mixes it into the negative solution of the kick-back line, thereby absorbing oxygen from the positive gas.

2. The storage system of claim 1, further comprising:
   a positive pump to pump positive solution through the positive compartment; and
   a negative pump to pump negative solution through the negative compartment.

3. The storage system of claim 1, comprising a balancing line in fluid communication with the positive and negative vent spaces, to return oxygen-stripped positive gas of the negative vent space to the positive vent space.

4. The storage system of claim 1, wherein the negative solution and positive gas mixture exiting the eductor flows into the negative vent space and is further scavenged by the negative solution of the negative reservoir.

5. The storage system of claim 1, wherein the cell includes a plurality of cells, each cell further comprising:
 a positive electrode in communication with the positive solution; and
 a negative electrode in communication with the negative solution.

6. A redox battery energy storage system, comprising:
 a plurality of cells, each cell including a positive compartment having positive solution, a negative compartment having negative solution, and a membrane separating the positive and negative compartments;
 a main positive line;
 a plurality of positive lines coupled to the main positive line, each positive line also coupled to the corresponding positive compartment of each cell, to carry positive solution;
 a positive reservoir coupled to the main positive line and having positive solution, the positive reservoir having a positive vent space for positive gas, including oxygen;
 a main negative line;
 a plurality of negative lines coupled to the main negative line, each negative line coupled to the corresponding negative compartment of each cell, to carry negative solution;
 a negative reservoir coupled to the main negative line and having negative solution, the negative reservoir having a negative vent space for negative gas;
 an eductor;
 a kick-back line coupled to the main negative line and to the negative reservoir to partially recirculate the negative solution, the eductor coupled to the kick-back line, the negative solution of the kick-back line to act as a motive liquid; and
 a positive gas draw line in fluid communication with the positive vent space and coupled to the eductor, whereby the eductor entrains positive gas from the positive vent space and mixes it into the negative solution of the kick-back line, thereby absorbing oxygen from the positive gas.

7. The storage system of claim 6, further comprising:
 a positive pump to pump positive solution through the plurality of positive compartments; and
 a negative pump to pump negative solution through the plurality of negative compartments.

8. The storage system of claim 6, comprising a balancing line in fluid communication with the positive and negative vent spaces, to return positive gas drawn into the negative vent space to the positive vent space.

9. The storage system of claim 6, wherein each of the plurality of cells further comprises:
 a positive electrode in communication with the positive solution; and
 a negative electrode in communication with the negative solution.

10. The storage system of claim 6, wherein the negative solution and positive gas mixture exiting the eductor flows into the negative vent space and is further scavenged by the negative solution of the negative reservoir.

* * * * *